(12) United States Patent
Lee et al.

(10) Patent No.: US 12,249,705 B2
(45) Date of Patent: Mar. 11, 2025

(54) COMPOSITE MATERIAL

(71) Applicant: ILIKA TECHNOLOGIES LTD, Romsey (GB)

(72) Inventors: Christopher Edward Lee, Southampton (GB); David Laughman, Acton, MA (US); Sergey Yakovlev, Gouda (NL); Lichun Chen, Southampton (GB)

(73) Assignee: ILIKA TECHNOLOGIES LTD, Romsey (GB)

( * ) Notice: Subject to any disclaimer, the term of this patent is extended or adjusted under 35 U.S.C. 154(b) by 622 days.

(21) Appl. No.: 17/415,353

(22) PCT Filed: Dec. 20, 2019

(86) PCT No.: PCT/GB2019/053651
§ 371 (c)(1),
(2) Date: Jun. 17, 2021

(87) PCT Pub. No.: WO2020/128505
PCT Pub. Date: Jun. 25, 2020

(65) Prior Publication Data
US 2022/0069291 A1    Mar. 3, 2022

(30) Foreign Application Priority Data
Dec. 21, 2018 (GB) .................... 1821094

(51) Int. Cl.
*H01M 4/36* (2006.01)
*H01M 4/02* (2006.01)
*H01M 4/04* (2006.01)

(52) U.S. Cl.
CPC ......... *H01M 4/364* (2013.01); *H01M 4/0414* (2013.01); *H01M 2004/021* (2013.01)

(58) Field of Classification Search
CPC ............... H01M 4/364; H01M 4/0414; H01M 2004/021
(Continued)

(56) References Cited

U.S. PATENT DOCUMENTS 10,044,028 B1    8/2018  Colclasure
2002/0122971 A1  9/2002  Ghosh et al.
(Continued)

FOREIGN PATENT DOCUMENTS

CN    101997111 A    3/2011
CN    104106164 A    10/2014
(Continued)

OTHER PUBLICATIONS

Office Action issued in corresponding Japanese Patent Application No. 2021-536361 mailed Dec. 26, 2023.
(Continued)

*Primary Examiner* — Christian Roldan
*Assistant Examiner* — Robert Gene West
(74) *Attorney, Agent, or Firm* — Renner, Otto, Boisselle & Sklar, LLP (57) ABSTRACT

A composite material for use as an electrode of an electrochemical cell comprises: a matrix that is provided by matrix particles that comprise an electrode active material; and a conductive fraction that is both electronically-conductive and ionically-conductive, the conductive fraction being provided by conductive particles that are distributed among the matrix particles. The conductive particles comprise either a material that is both ionically- and electronically-conductive; or a mixture of ionically-conductive particles and electronically-conductive particles, the electronically-conductive particles having a sphericity of at least 0.6. The conductive particles have a D90 value that is at least 10% of the D50 value of the matrix particles.

13 Claims, 2 Drawing Sheets

(58) Field of Classification Search
USPC .................................................... 429/209
See application file for complete search history.

(56) References Cited

U.S. PATENT DOCUMENTS

| | | | |
|---|---|---|---|
| 2004/0229124 A1* | 11/2004 | Miyamoto | H01M 4/505 |
| | | | 429/231.95 |
| 2005/0241137 A1* | 11/2005 | Suzuki | H01M 4/70 |
| | | | 204/290.01 |
| 2008/0280751 A1 | 11/2008 | Harutyunyan et al. | |
| 2009/0224198 A1 | 9/2009 | Mori et al. | |
| 2015/0357644 A1* | 12/2015 | Holme | H01M 10/052 |
| | | | 429/231.95 |
| 2016/0365569 A1 | 12/2016 | Lee et al. | |
| 2017/0018781 A1 | 1/2017 | Zimmerman | |
| 2017/0200939 A1 | 7/2017 | Murphy et al. | |
| 2017/0263938 A1 | 9/2017 | Harutyunyan et al. | |
| 2017/0267530 A1 | 9/2017 | Harutyunyan et al. | |
| 2017/0271652 A1 | 9/2017 | Harutyunyan et al. | |
| 2019/0173082 A1 | 6/2019 | Zhamu et al. | |
| 2020/0083527 A1 | 3/2020 | Nakamura | |

FOREIGN PATENT DOCUMENTS

| | | |
|---|---|---|
| CN | 106099080 A | 11/2016 |
| CN | 106605329 A | 4/2017 |
| CN | 107706352 | 9/2020 |
| EP | 3298644 A | 3/2018 |
| JP | 2003123748 A | 4/2003 |
| JP | 2012243644 A | 12/2012 |
| JP | 2017045593 A | 3/2017 |
| KR | 1020010104686 A | 11/2001 |
| KR | 1020170012222 A | 2/2017 |
| WO | 2013121642 A1 | 8/2013 |
| WO | 2013/131005 | 9/2013 |
| WO | 2014/132333 | 9/2014 |
| WO | 2016184896 A1 | 11/2016 |
| WO | 2018180742 A1 | 10/2018 |

OTHER PUBLICATIONS

Shim et al, "Mixed Electronic and Ionic Conductor-Coated Cathode Material for High-Voltage Lithium Ion Battery" Applied Materials and Interfaces 2016, 8, pp. 12205-12210.

United Kingdom Search Report mailed Oct. 24, 2019 in corresponding United Kingdom Application No. 1821094.8.

International Search Report and Written Opinion mailed Mar. 25, 2020 in corresponding International Application No. PCT/GB2019/053651.

United Kingdom Search Report mailed Jun. 26, 2019 in corresponding United Kingdom Application No. 1821094.8.

Roberts et al, "High Throughput Screening of the Effect of Carbon Coating in LiFePO4 Electrodes" Journal of the Electrochemical Society 2007. 154, pp. A921-A928.

Shanefield, "Organic Additives and Ceramic Processing With Applications in Powder Metallurgy, Ink, and Paint," Springer Science+Business Media, LLC, second edition, 1999, pp. i-29.

Nitta et al, "Li-ion battery materials: present andfuture" Materials Today, 2015, 18, pp. 252-264.

Furnas, "Grading Aggregates: Mathematical Relations for Beds of Broken Solids of Maximum Density," Ind. Eng. Chem, 1931. pp 1052-1058.

Ogarko, "Soft Matter," RSC Publishing, 2013, pp. 9530-9534.

Meng, "Packing properties of binary mixtures in disordered sphere systems," Particuology, 2014, pp. 155-166.

Ye, "Method for calculating packing density of powder particles in paste with continuous particle size distribution," Adv. Powder Technol., 2018, pp. 88-93.

Kwan, "A 3-parameter particle packing model incorporating the wedging effect," Powder Technol., 2013, pp. 172-179.

Chang, "A particle packing model for sand-silt mixtures with the effect of dual-skeleton" Granular Mater, 2017, pp. 1-15.

Ueda, "Effect of particle size ratio and volume fraction on shear strength of binary granular mixture," Granular Matter, 2011, pp. 732-742.

Rahatekar, "Mesoscale modeling of electrical percolation in fiber-filled systems," J. Chem. Phys., 2005.

Zallen, "Physics of Amorphous Solids," Wiley, New York, 1998 (Chapter 4), pp. 135-204.

Ziff, "Percolation of dosordered jammed sphere packing," J. Phys. A: Math. Theor., 2017, pp. 1-8.

West, "Solid Electrolyte and Mixed Ionic-Electronic Conductors: An Application Overview," J Mater Chem 1, 1992, pp. 157-162.

Hideki, "Lithium Titanate Ceramic System as Electronic and Li-ion Mixed Conductors for Cathode Matrix in Lithium-Sulfur Battery," Dissertation, 2012.

Smekens et al., "Influence of Electrode Density on the Performance of Li-Ion Batteries: Experimental and Simulation Results," Energies 2016, 9, 104, (2016), pp. 1-12.

Kato et al., "All-Solid-State Batteries with Thick Electrode Configurations," The J. of Physical Chem. Letters, 2018, pp. 607-613.

Venkat Anandan, "Requirement, Design, and Challenges in Inorganic Solid State Batteries," Ford Energy Storage Research Department, Ceramics Expo, 2017.

Lestriez, "From compound to electrode for battery: games of architecture and composite materials," Jean Rouxel Materials Institute, Nantes—Seminaer, 2014, http://www.college-de-france.fr/site/jean-marie-tarascon/seminar-2014-02-17-17h30.htm.

Yu et al Nat. Materials (2018).

Yu et al, Nature Communications (2017).

Lestriez, "From compound to electrode for battery: games of architecture and composite materials," Jean Rouxel Materials Institute, Nantes—Seminaer, 2014, http://www.college-de-france.fr/site/jean-marie-tarascon/seminar-2014-02-17-17h30.htm with machine transcription and English translation.

First Office Action for corresponding Chinese Application No. 201980091801.4 mailed Jun. 1, 2023.

Combined Search and Examination Report for corresponding United Kingdom Application GB2216805.8 mailed Jan. 19, 2023.

Zhang, Keli, "Solid State Inorganic Chemistry," Wuhan University Press, Jan. 31, 2005, pp. 152-153.

\* cited by examiner

COMPOSITE MATERIAL

This application is a national phase of International Application No. PCT/GB2019/053651 filed Dec. 20, 2019, which claims priority to United Kingdom Application No. 1821094.8 filed Dec. 21, 2018, all of which are hereby incorporated herein by reference in their entireties.

FIELD OF THE INVENTION

The present invention relates to composite materials, particularly composite materials for use as electrodes in an electrochemical cell, and methods for the manufacture thereof.

BACKGROUND TO THE INVENTION

A solid-state lithium-ion battery is a type of rechargeable battery in which lithium ions (Li+) move from the negative electrode to the positive electrode during discharge and back when charging. The electrodes are each capable of reversibly storing lithium ions and are separated by a solid bulk electrolyte, which allows for ionic transport.

Each of these components is typically formed as a thin film, deposited in sequence on a supporting substrate. Additional components such as current collectors, interface modifiers and encapsulations may also be provided. In manufacture, the components may be deposited, for example, in the order of cathode current collector, cathode, electrolyte, anode, anode current collector and encapsulation. However, the order of deposition may be varied, providing that the resulting device contains a positive electrode (cathode), an electrolyte separator and a negative electrode (anode).

Solid-state batteries may provide multiple advantages over liquid electrolyte lithium-ion batteries, such as increased energy density, increased power density, low leakage currents and reduced flammability. Thus, solid-state batteries have been considered for use in, for example, electric vehicles and consumer electronics. In such applications, it is generally desirable to increase energy density still further to boost vehicle range (in the case of electric vehicles), device efficiency and/or device lifetime.

One approach to increasing energy density is to make electrodes thicker, so as to reduce the relative volume of inactive components of the battery, such as current collectors and the bulk electrolyte layer. However, this may have an adverse effect on the power that can be achieved by the battery, due to constraints resulting from ion and/or electron transport rates in thick electrodes.

In the context of liquid electrolyte lithium-ion batteries, it is known, for example, to increase ion transport rates by increasing electrode porosity (see, for example, Roberts et al, *Journal of the Electrochemical Society* 2007, 154, A921-A928). This is thought to increase the amount of accessible surface area through which ion transport may occur between the liquid and solid phases. However, the challenges of ion and electron transport remain to be addressed in the context of solid-state batteries.

SUMMARY OF THE INVENTION

In a first aspect, the present invention may provide a composite material comprising:
   a matrix that is provided by matrix particles that comprise an electrode active material; and
   a conductive fraction that is both electronically-conductive and ionically-conductive, the conductive fraction being provided by conductive particles that are distributed among the matrix particles;
   wherein the conductive particles have a D90 value that is at least 5% of the D50 value of the matrix particles.

The conductive particles may comprise a material that is both ionically-conductive and electronically-conductive. However, in other cases, the conductive particles may comprise a mixture of:
   ionically-conductive particles; and
   electronically-conductive particles, the electronically-conductive particles having a sphericity of at least 0.6.

By providing conductive particles that are a mixture of ionically-conductive particles and electronically-conductive particles, the materials provided in each of these particle types may be selected from a broader range, so as to tailor the properties of the composite material more closely. Typically, in the case that the conductive particles are a mixture of ionically-conductive particles and electronically-conductive particles, the D50 values of the ionically-conductive particles and electronically-conductive particles are broadly similar: for example, the largest of the two D50 values may be less than twice the smallest of the two D50 values.

It is thought that by providing conductive particles having the specified D90 value, these particles will be large enough to hinder close-packing of the matrix particles. As a result, adjacent matrix particles may be wedged apart by the conductive particles, so as to establish pathways and/or networks between the matrix particles, these pathways and/or networks allowing for the transport of ions and/or electrons throughout the composite material.

This may allow the composite material to provide an electrode having increased thickness while maintaining the levels of ionic and electronic conductivity required to provide acceptable performance in an electrochemical device.

By contrast, it is thought that if the conductive particles have a D90 value that is less than 5% of the D50 value of the matrix particles, the conductive particles may effectively become trapped in the interstices between adjacent matrix particles, such that the conductive particles are isolated from each other and the establishment of transport routes for ions and/or electrons is hindered.

In certain cases, the conductive particles have a D90 value that is at least 7% of the D50 value of the matrix particles. In certain cases, the conductive particles have a D90 value that is at least 10% of the D50 value of the matrix particles. In certain cases, the conductive particles have a D90 value that is at least 15% of the D50 value of the matrix particles. In certain cases, the conductive particles have a D90 value that is at least 20% of the D50 value of the matrix particles.

In certain embodiments, the conductive particles have a D90 value that is at least 5% of the D90 value of the matrix particles. In certain embodiments, the conductive particles have a D90 value that is at least 10% of the D90 value of the matrix particles. In certain embodiments, the conductive particles have a D90 value that is at least 15% of the D90 value of the matrix particles.

In the case that the conductive particles comprise a mixture of electronically-conductive particles and ionically-conductive particles, the two particle types are generally provided within the composite material in broadly similar amounts, as measured by volume. Thus, for example, the ratio of electronically-conductive particles to ionically-conductive particles (expressed as the ratio of the total volume of each particle type) may lie in the range from 5:1 to 1:5.

In certain embodiments, this ratio may lie in the range from 3:1 to 1:3. In certain embodiments, this ratio may lie in the range from 2:1 to 1:2.

Typically, the conductive particles provide a volume fraction of at least 5 vol % of the composite material, in certain cases 10 vol % of the composite material, preferably at least 15 vol %, more preferably at least 20 vol % (the term "volume fraction" is used herein to denote the volume fraction measured relative to the solid volume of the composite material, that is, excluding any voids that may be present in the composite material). It is thought that this volume of conductive particles is required to fill the pathways that are created between adjacent matrix particles that are wedged apart.

In the case that the conductive particles comprise a mixture of electronically-conductive particles and ionically-conductive particles, it is preferred that the conductive particles provide a volume fraction of at least 10 vol % of the composite material, in certain cases at least 15 vol % of the composite material, preferably at least 18 vol %, more preferably at least 22 vol %. It is thought that a greater proportion of mixed particles is required to establish distinct, but generally interpenetrated, networks to enable the transport of both electrons and ions.

Typically, the conductive particles provide up to 35 vol % of the composite material, preferably up to 30 vol %, more preferably up to 28 vol %. It is thought that these upper limits on the volume fraction of the conductive particles may allow transport pathways to be provided for electrons and/or ions, while providing sufficient electrode active material to retain acceptable levels of gravimetric capacity (the gravimetric capacity being the total charge capacity of the battery, expressed as a function of the battery weight). It is also thought that once the volume fraction of conductive particles has exceeded a certain threshold, fully-formed conductive networks are present and there is no significant advantage in adding further conductive particles.

In certain cases, the conductive particles provide 5-35 vol % of the composite material. In certain cases, the conductive particles provide 10-30 vol % of the composite material.

Preferably, the conductive particles should have a D90 value that is up to 30%, more preferably up to 25%, most preferably up to 20% of the D90 value of the matrix particles.

It is thought that by providing matrix particles having a broad particle size distribution, denser packing of these particles may be achieved, thus increasing gravimetric capacity. Thus, it is preferred that the particle size distribution of the matrix particles is such that the D90 value for the matrix particles is at least 1.5 times the D50 value, more preferably at least 1.7 times the D50 value, most preferably at least 2 times the D50 value.

It is thought that by providing conductive particles having a broad particle size distribution, denser packing of these particles may be achieved. Thus, it is preferred that the particle size distribution of the conductive particles is such that the D90 value for the conductive particles is at least 1.5 times the D50 value, more preferably at least 1.7 times the D50 value, most preferably at least 2 times the D50 value.

In certain cases, the particle size distribution of the matrix particles and/or the conductive particles is monomodal, that is, it has a single peak.

Typically, the conductive particles have a D50 value of at least 5 nm. In certain embodiments, the conductive particles may have a D50 value of at least 10 nm. In certain embodiments, the conductive particles may have a D50 value of at least 20 nm. In certain embodiments, the conductive particles may have a D50 value of at least 100 nm.

Typically, the conductive particles have a D50 value of up to 5 µm. In certain embodiments, the conductive particles have a D50 value of up to 2 µm. In certain embodiments, the conductive particles have a D50 value of up to 500 nm. In certain embodiments, the conductive particles have a D50 value of up to 400 nm. In certain embodiments, the conductive particles have a D50 value of up to 300 nm.

Typically, the conductive particles have a D90 value of at least 50 nm. In certain embodiments, the conductive particles may have a D90 value of at least 100 nm. In certain embodiments, the conductive particles may have a D90 value of at least 200 nm. In certain embodiments, the conductive particles may have a D90 value of at least 500 nm.

Typically, the conductive particles have a D90 value of up to 25 µm. In certain embodiments, the conductive particles have a D90 value of up to 20 µm. In certain embodiments, the conductive particles have a D90 value of up to 15 µm. In certain embodiments, the conductive particles have a D90 value of up to 10 µm. In certain embodiments, the conductive particles have a D90 value of up to 5 µm. In certain embodiments, the conductive particles have a D90 value of up to 2 µm. In certain embodiments, the conductive particles have a D90 value of up to 1 µm.

Typically, the matrix particles have a D50 value of at least 0.1 µm. In certain embodiments, the matrix particles have a D50 value of at least 0.2 µm. In certain embodiments, the matrix particles have a D50 value of at least 0.5 µm.

Typically, the matrix particles have a D50 value of up to 20 µm. In certain embodiments, the matrix particles have a D50 value of up to 15 µm. In certain embodiments, the matrix particles have a D50 value of up to 10 µm. In certain embodiments, the matrix particles have a D50 value of up to 5 µm. In certain embodiments, the matrix particles have a D50 value of up to 2 µm. In certain embodiments, the matrix particles have a D50 value of up to 1 µm.

Typically, the matrix particles have a D90 value of at least 0.5 µm. In certain embodiments, the matrix particles have a D90 value of at least 1 µm. In certain embodiments, the matrix particles have a D90 value of at least 2 µm. In certain embodiments, the matrix particles have a D90 value of at least 5 µm.

Typically, the matrix particles have a D90 value of up to 40 µm. In certain embodiments, the matrix particles have a D90 value of up to 30 µm. In certain embodiments, the matrix particles have a D90 value of up to 20 µm. In certain embodiments, the matrix particles have a D90 value of up to 15 µm. In certain embodiments, the matrix particles have a D90 value of up to 12 µm.

Preferably, the particle size distribution of the conductive particles and/or the matrix particles is positively skewed, that is, the median particle size is greater than the mode.

The term "electrode active material" refers to a material that is capable of reversibly storing lithium ions. In general, the electrode active material is provided either by a lithium intercalating material or a material that is capable of alloying with lithium ions. In certain cases, the electrode active material may be configured such that its capacity to store lithium ions (whether through intercalation or alloying) increases after the electrode in which it is provided first experiences a lithiation process to form the active electrode material in a matrix (such electrodes may be termed "conversion electrodes").

Typically, the electrode active material has a gravimetric capacity greater than 100 mAh/g, preferably greater than 200 mAh/g, more preferably greater than 400 mAh/g.

Typically, in the case that the composite material is intended for use as an anode of an electrochemical cell, the electrode active material is selected from the group consisting of the elements lithium, silicon, carbon, tin, magnesium, aluminium, titanium, boron, and iron, and combinations thereof. Alternatively, the electrode active material may be selected from the group consisting of phosphates, nitrides and oxides of lithium, silicon, carbon, tin, magnesium, aluminium, titanium, boron, and iron; and combinations thereof. Specific examples of possible compounds for use in an anode include lithium titanium oxide ($Li_4Ti_5O_{12}$) and $SnO_2$.

Conversely, in the case that the composite material is intended for use as a cathode of an electrochemical cell, the electrode active material is typically a compound containing the cations of lithium and one or more transition metals, and an anion selected from the group consisting of: oxide anion, sulphide anion, and polyanions. Examples of suitable polyanions include phosphate, $PO_4F$, and $SO_4F$.

For example, the electrode active material for a composite material intended for use as a cathode may be selected from the group consisting of lithium nickel cobalt aluminium oxide ($LiNi_{0.8}Co_{0.15}Al_{0.05}O_2$); lithium cobalt oxide ($LiCoO_2$); lithium iron phosphate ($LiFePO_4$); lithium manganese nickel oxide ($LiMn_{1.5}Ni_{0.5}O_4$); lithium cobalt phosphate ($LiCoPO_4$); lithium nickel cobalt manganese oxide ($LiNi_xCo_yMn_zO_2$) and combinations thereof. Metal chalcogenides such as $TiS_3$, $NbSe_3$, $LiTiS_2$ and combinations thereof may also provide suitable electrode active materials in the case that the composite material is intended for use as a cathode.

Descriptions of suitable electrode active materials for both anodes and cathodes may be found in Nitta et al, *Materials Today*, 2015, 18, 252-264, which is hereby incorporated by reference.

In certain cases, the matrix particles may comprise a coating layer having a different composition and/or different properties to the particle core. Such a coating layer may extend partially or wholly about the particle core.

In the case that the conductive particles comprise a material that is both ionically-conductive and electronically-conductive (that is, a material that is a mixed ion electron conductor), the ionic conductivity of the material is typically at least $10^{-8}$ $Scm^{-1}$ and the electronic conductivity of the material is typically at least $10^{-8}$ $Scm^{-1}$. In certain embodiments, the ionic conductivity of the material may be at least $10^{-6}$ $Scm^{-1}$. In certain embodiments, the ionic conductivity of the material may be at least $10^{-5}$ $cm^{-1}$. In certain embodiments, the electronic conductivity of the material may be at least $10^{-6}$ $Scm^{-1}$. In certain embodiments, the electronic conductivity of the material may be at least $10^{-5}$ $cm^{-1}$.

Examples of suitable mixed conductors include lithium titanate ceramics in which partial reduction of Ti(IV) to Ti(III) has occurred, in particular $Li_{4/3}Ti_{5/3}O_4$ (which typically has a spinel structure). A further suitable mixed conductor may be provided by the lithium ionic conductor $Li_{1+x}Al_xTi_{2-x}(PO_4)_3$ (where, for example, x=0.3). This is thought to be electrically-conductive in the presence of dopant ions such as $Mg^{2+}$, which are thought to cause a partial reduction in Ti(IV) to Ti(III) (see, for example, Shim et al, *Applied Materials and Interfaces* 2016 8 12205-12210).

In the case that the conductive particles are provided by a mixture of electronically-conductive particles and ionically-conductive particles, the electronically-conductive particles typically comprise an electronically-conductive material having an electronic conductivity of at least $10^{-8}$ $Scm^{-1}$. In certain embodiments, the electronic conductivity of the electronically conductive material may be at least $10^{-6}$ $Scm^{-1}$. In certain embodiments, the electronic conductivity of the electronically conductive material may be at least $10^{-5}$ $Scm^{-1}$.

In general, the electronically-conductive particles comprise an electronically-conductive material that is selected from the group consisting of: indium tin oxide; antimony tin oxide; vanadium pentoxide; a carbonaceous material (such as amorphous carbon); non-stoichiometric molybdenum nitride; aluminium-doped zinc oxide; and mixtures thereof. In certain embodiments, the electronically-conductive particles may comprise indium tin oxide.

In the case that the conductive particles are provided by a mixture of electronically-conductive particles and ionically-conductive particles, the ionically-conductive particles typically comprise an ionically-conductive material having an ionic conductivity of at least $10^{-8}$ $Scm^{-1}$. In certain embodiments, the ionic conductivity of the ionically conductive material may be at least $10^{-6}$ $Scm^{-1}$. In certain embodiments, the ionic conductivity of the ionically conductive material may be at least $10^{-5}$ $Scm^{-1}$.

In certain cases, the ionically-conductive particles comprise lithium lanthanum zirconium oxide and its doped variants, including as dopants tantalum, niobium, aluminium, titanium, gadolinium, germanium, silicon, antimony, and combinations thereof. For example, the ionically-conductive particles may comprise $Li_{6.75}La_3Zr_{1.75}Ta_{0.25}O_{12}$. Additional stoichiometries of interest within the lithium lanthanum zirconium oxide family of materials include $Li_7La_3Zr_{1.4}Ta_{0.6}O_{12}$, $Li_{6.75}La_3Zr_{1.75}Ta_{0.5}O_{12}$; $Li_6La_3ZrTaO_{12}$; $Li_{7-x}La_3Zr_{2-x}Ta_xO_{12}$ (where, for example, 0≤x≤2); $Li_{7-x}La_{3-y}M_yZr_{2-x}N_xO_{12}$ (where, for example, M=calcium, cerium, or antimony; N=tantalum, niobium, magnesium, scandium, aluminium, or gallium, 0≤y≤1; and 0≤x≤1).

Other suitable ionically-conductive materials that may be provided within the ionically-conductive particles include: lithium aluminium germanium phosphorous oxide; lithium aluminium titanium phosphorous oxide; lithium lanthanum titanium oxide; $Li_3OCl$; $LiBH_4$; $3LiBH_4 \cdot LiI$; $7LiBH_4 \cdot LiI$; $3LiBH_4 \cdot LiBr$; $3LiBH_4 \cdot LiCl$; and combinations thereof.

In certain embodiments, the ionically-conductive particles may comprise an ionically-conductive polymeric material, such as described in US 2017/0018781, which is hereby incorporated by reference.

The selection of the constituent materials for the composite material (including the electrode active material and the electronically- and/or ionically-conductive materials) is generally at least partly influenced by consideration of the processing temperatures used in the manufacture of the composite material and/or any subsequent device into which the composite material is incorporated, as it is desirable for the materials to perform adequately after processing. In certain cases, the processing temperatures may be held below 450° C., in other cases, the processing temperatures may lie in the range 450-850° C., and in yet further cases, the processing temperatures may lie above 850° C.

In the case that the conductive particles are provided by a mixture of electronically-conductive particles and ionically-conductive particles, the electronically-conductive particles are blocky in shape, as indicated by a sphericity of at least 0.6, rather than being shaped as needles, filaments, or other high-aspect ratio forms. Typically, the sphericity of the electronically-conductive particles is at least 0.7, most preferably at least 0.8.

Typically, the sphericity of the matrix particles and/or the ionically-conductive particles is at least 0.6, preferably at least 0.7, more preferably at least 0.8.

In a second aspect, the present invention may provide a composite material comprising a matrix that is provided by matrix particles that comprise an electrode active material; an ionically-conductive fraction that is provided by ionically-conductive particles that are distributed among the matrix particles; and an electronically-conductive fraction that is distributed among the matrix particles;
   wherein the ionically-conductive particles have a D90 value that is at least 5% of the D50 value of the matrix particles.

In the composite material according to the second aspect of the invention, the electronically-conductive phase or fraction may be provided in the form of high-aspect ratio components, such as filaments or needles. Such high-aspect ratio components typically have a length that is at least 4 times their diameter, in certain cases at least 5 times their diameter. Such high-aspect ratio materials may include titanium nitride whiskers and carbonaceous high-aspect materials, e.g. carbon nanotubes. An electronically-conductive phase or fraction provided in this form may provide a transport route for electrons without separating the particles of the electrode active material significantly from each other.

In other cases, the electronically-conductive fraction may be provided in the form of blocky particles having a sphericity of at least 0.6, but whose particle size is significantly lower than that of the ionically-conductive particles. For example, the D50 value of the particles of the electronically-conductive fraction may be less than 25% (in some embodiments less than 15%) of the D50 value of the particles of the ionically-conductive phase. In such cases, the particles of the electronically-conductive fraction may comprise any one of the electronically-conductive materials specified in relation to the first aspect of the invention.

In such cases, it is thought that ionically-conducting particles having a D90 value that is at least 5% of the D50 value of the matrix particles may be required in order to ensure sufficient separation of the matrix particles so as to allow the provision of transport routes for ions. That is, in such cases, the function of wedging matrix particles apart is provided largely by the ionically-conductive particles.

In certain cases, the ionically-conductive particles have a D90 value that is at least 7% of the D50 value of the matrix particles. In certain cases, the ionically-conductive particles have a D90 value that is at least 10% of the D50 value of the matrix particles. In certain cases, the ionically-conductive particles have a D90 value that is at least 15% of the D50 value of the matrix particles. In certain cases, the ionically-conductive particles have a D90 value that is at least 20% of the D50 value of the matrix particles.

Typically, the ionically-conductive particles are present in a volume fraction of at least 3 vol % of the composite material, in certain cases at least 5 vol % of the composite material, in further cases at least 10 vol % of the composite material, preferably at least 15 vol %, more preferably at least 20 vol %.

In general, the ionically-conductive particles are present in a volume fraction of up to 35 vol % of the composite material, preferably up to 30 vol %, more preferably up to 28 vol %.

In certain cases, the ionically-conductive particles are present in a volume fraction of 5-35 vol % of the composite material. In certain cases, the ionically-conductive particles are present in a volume fraction of 10-30 vol % of the composite material.

In certain embodiments, the ionically-conductive particles have a D90 value that is at least 5% of the D90 value of the matrix particles. In certain embodiments, the ionically-conductive particles have a D90 value that is at least 10% of the D90 value of the matrix particles. In certain embodiments, the ionically-conductive particles have a D90 value that is at least 15% of the D90 value of the matrix particles.

In general, the ionically-conductive particles have a D90 value that is up to 30% of the D90 value of the matrix particles, preferably up to 25%, more preferably up to 20%.

Preferably, the particle size distribution of the ionically-conductive particles is such that the D90 value for the ionically-conductive particles is at least 1.5 times the D50 value, more preferably at least 1.7 times the D50 value, most preferably at least 2 times the D50 value.

In general, the particle size distribution of the matrix particles is such that the D90 value for the matrix particles is at least 1.5 times the D50 value, more preferably at least 1.7 times the D50 value, most preferably at least 2 times the D50 value.

In certain cases, the particle size distribution of the matrix particles and/or the ionically-conductive particles is monomodal, that is, it has a single peak.

Typically, the ionically-conductive particles have a D50 value of at least 5 nm. In certain embodiments, the ionically-conductive particles may have a D50 value of at least 10 nm. In certain embodiments, the ionically-conductive particles may have a D50 value of at least 20 nm. In certain embodiments, the ionically-conductive particles may have a D50 value of at least 100 nm.

Typically, the ionically-conductive particles have a D50 value of up to 5 µm. In certain embodiments, the conductive particles have a D50 value of up to 2 µm. In certain embodiments, the conductive particles have a D50 value of up to 500 nm. In certain embodiments, the ionically-conductive particles have a D50 value of up to 400 nm. In certain embodiments, the ionically-conductive particles have a D50 value of up to 300 nm.

Typically, the ionically-conductive particles have a D90 value of at least 50 nm. In certain embodiments, the ionically-conductive particles may have a D90 value of at least 100 nm. In certain embodiments, the ionically-conductive particles may have a D90 value of at least 200 nm. In certain embodiments, the ionically-conductive particles may have a D90 value of at least 500 nm.

Typically, the ionically-conductive particles have a D90 value of up to 25 µm. In certain embodiments, the conductive particles have a D90 value of up to 20 µm. In certain embodiments, the conductive particles have a D90 value of up to 15 µm. In certain embodiments, the conductive particles have a D90 value of up to 10 µm. In certain embodiments, the conductive particles have a D90 value of up to 5 µm. In certain embodiments, the conductive particles have a D90 value of up to 2 µm. In certain embodiments, the ionically-conductive particles have a D90 value of up to 1 µm.

Typically, the matrix particles have a D50 value of at least 0.1 µm. In certain embodiments, the matrix particles have a D50 value of at least 0.2 µm. In certain embodiments, the matrix particles have a D50 value of at least 0.5 µm.

Typically, the matrix particles have a D50 value of up to 20 µm. In certain embodiments, the matrix particles have a D50 value of up to 15 µm. In certain embodiments, the matrix particles have a D50 value of up to 10 µm. In certain embodiments, the matrix particles have a D50 value of up to 5 µm. In certain embodiments, the matrix particles have a D50 value of up to 2 µm. In certain embodiments, the matrix particles have a D50 value of up to 1 µm.

Typically, the matrix particles have a D90 value of at least 0.5 µm. In certain embodiments, the matrix particles have a D90 value of at least 1 µm. In certain embodiments, the matrix particles have a D90 value of at least 2 µm. In certain embodiments, the matrix particles have a D90 value of at least 5 µm.

Typically, the matrix particles have a D90 value of up to 40 µm. In certain embodiments, the matrix particles have a D90 value of up to 30 µm. In certain embodiments, the matrix particles have a D90 value of up to 20 µm. In certain embodiments, the matrix particles have a D90 value of up to 15 µm. In certain embodiments, the matrix particles have a D90 value of up to 12 µm.

Preferably, the particle size distribution of the particles of the ionically-conductive material and/or the electrode active material is positively skewed, that is the median particle size is greater than the mode.

Suitable electrode active materials may comprise any of the electrode active materials described in relation to the first aspect of the invention.

Suitable ionically-conductive materials may comprise any of the ionically-conductive materials described in relation to the first aspect of the invention.

Typically, the sphericity of the particles of the electrode active material and/or the ionically-conductive particles is at least 0.6, preferably at least 0.7, more preferably at least 0.8.

In a third aspect, the present invention may provide a composite material comprising a matrix that is provided by matrix particles that comprise an electrode active material; an ionically-conductive fraction that is provided by ionically-conductive particles that are distributed among the matrix particles; and an electronically-conductive fraction that is provided by electronically-conductive particles that are distributed among the matrix particles;
  wherein the electronically-conductive particles have a D90 value that is at least 5% of the D50 value of the matrix particles.

In the composite material according to the third aspect of the invention, the particle size of the ionically-conductive particles may be significantly lower than that of the electronically-conductive particles. For example, the D50 value of the particles of the ionically-conductive fraction may be less than 25% (in some embodiments less than 15%) of the D50 value of the particles of the electronically-conductive fraction.

In such cases, it is thought that electronically-conductive particles having a D90 value that is at least 5% of the D50 value of the matrix particles may be required in order to ensure sufficient separation of the matrix particles so as to allow the provision of transport routes for charged species. That is, in such cases, the function of wedging matrix particles apart is provided largely by the electronically-conductive particles.

Effectively, the electrically-conductive particles in the composite material according to the third aspect of the invention perform an equivalent function to the ionically-conductive particles in the composite material according to the second aspect of the invention.

Thus, the amount and/or particle size distribution of the electronically-conductive particles present in the composite material according to the third aspect of the invention may correspond respectively to the amount and/or particle size distribution of the ionically-conductive particles present in the composite material according to the second aspect of the invention.

The amount and/or particle size distribution of the matrix particles present in the composite material according to the third aspect of the invention may correspond respectively to the amount and/or particle size distribution of the matrix particles present in the composite material according to the second aspect of the invention.

Suitable electrode active materials may comprise any of the electrode active materials described in relation to the first aspect of the invention.

The ionically-conductive particles may comprise any of the ionically-conductive materials described in relation to the first aspect of the invention.

The electronically-conductive particles may comprise any of the electronically-conductive materials described in relation to the first aspect of the invention.

Typically, the sphericity of the particles of the electrode active material, the electronically-conductive particles and/or the ionically-conductive particles is at least 0.6, preferably at least 0.7, more preferably at least 0.8.

The configuration of the composite material according to the first, second, or third aspects of the invention may allow a material to be provided that contains high amounts of electrode active material, and thus has a high gravimetric capacity. For example, the composite material may contain electrode active material in an amount of at least 50 vol %, preferably at least 65 vol %, most preferably at least 75 vol %.

Preferably, the porosity of the composite material according to the first second, or third aspect of the invention is less than 10% of the bulk volume of the composite material, preferably less than 5%, more preferably less than 3%. This is in contrast to liquid electrolyte lithium-ion batteries, that typically have significantly higher electrode porosity levels. It is thought that the low porosity levels of the composite material according to the first, second, or third aspects of the invention help to improve the mechanical strength of the material.

Typically, the composite material according to the first, second, or third aspects of the invention further comprises a binder phase. A suitable binder phase may comprise, for example, lithium borate.

The binder phase is generally present in a volume fraction of at least 1 vol % relative to the solid volume of the composite material. In certain embodiments, the binder phase is present in a volume fraction of at least 2 vol % relative to the solid volume of the composite material. In certain embodiments, the binder phase is present in a volume fraction of at least 5 vol % relative to the solid volume of the composite material.

The binder phase is generally present in an amount of up to 20 vol % relative to the solid volume of the composite material. In certain embodiments, the binder phase is present in an amount of up to 15 vol % relative to the solid volume of the composite material. In certain embodiments, the binder phase is present in an amount of up to 10 vol % relative to the solid volume of the composite material.

As is known to the person skilled in the art, the term "D50" refers to the median particle size of a sample of particles, that is, to a particle size that is greater than the size of 50% (by number) of the particles within the sample, and less than the size of 50% (by number) of the particles in the sample.

As is known to the person skilled in the art, the term "D90" refers to a particle size that is greater than the size of 90% (by number) of the particles within a sample, and less than the size of 10% (by number) of the particles in the sample.

The term "particle size" denotes the average diameter of a particle.

As will be understood by the person skilled in the art, the particle size distributions described herein, including the D50 and D90 values, relate to three-dimensional particles. The skilled person is able to determine these values from a two-dimensional cross-section of the composite material according to the first, second, or third aspects of the invention using methods known in the art.

In a fourth aspect, the present invention may provide an electrode comprising either:
  a composite material according to either of the first, second, or third aspects of the invention; or
  a composite material made according to the method of the seventh, eighth, or ninth aspects of the invention.

Typically, the composite material comprised in the at least one electrode has a planar configuration. Preferably, the composite material comprised in the at least one electrode has a thickness of at least 300 μm, preferably at least 400 μm, more preferably at least 500 μm.

In a fifth aspect, the present invention may provide a sub-structure for incorporation into an electrochemical cell, the sub-structure comprising an electrode according to the fourth aspect of the invention, wherein the electrode is supported on a substrate.

Typically, the composite material forms a layer on the substrate.

In certain cases, the sub-structure may further include a current-collecting material that is in electrical contact with the composite material. For example, the current-collecting material may be provided between the composite material and the substrate. The current-collecting material may be a metal or a conducting metal oxide. For example, the current-collecting material may be selected from the group consisting of: platinum, aluminium, titanium, chromium, iron, zinc, gold, silver, nickel, molybdenum, tin oxide, indium tin oxide and stainless steel.

In certain embodiments, the substrate may be provided by the current-collecting material.

In a sixth aspect, the present invention may provide an electrochemical cell comprising two electrodes and a bulk electrolyte disposed therebetween, wherein at least one electrode comprises either:
  a composite material according to the first, second, or third aspects of the invention; or
  a composite material made according to the method of the seventh, eighth, or ninth aspects of the invention.

Preferably, the composite material comprised in the at least one electrode has a thickness of at least 300 μm, preferably at least 400 μm, more preferably at least 500 μm. This may result in an increased volume fraction of the electrochemical cell being occupied by the electrode active material, which may increase the energy density of the cell.

The electrochemical cell typically comprises a current collector that is in electrical contact with the at least one electrode.

In certain cases, the at least one electrode may provide the cathode of the electrochemical cell. In other cases, the at least one electrode may provide the anode of the electrochemical cell.

Typically, the electrochemical cell is an all solid-state electrochemical cell.

In a seventh aspect, the present invention may provide a method of making a composite material, the method comprising the steps of:
  providing a quantity of matrix particles, the matrix particles comprising an electrode active material;
  providing a quantity of conductive particles, the conductive particles comprising either:
    a material that is ionically- and electronically-conductive; or
    a mixture of ionically-conductive particles and electronically-conductive particles, the electronically-conductive particles having a sphericity of at least 0.6;
  preparing an ink formulation comprising the matrix particles, the conductive particles, and a fluid carrier medium; and
  depositing the ink formulation on a substrate to provide a printed layer;
  wherein the conductive particles have a D90 value that is at least 5% of the D50 value of the matrix particles.

The composition, particle size distribution and other properties of the matrix particles and the conductive particles may be as specified in relation to the equivalent elements of the first aspect of the invention.

In certain cases, the conductive particles have a D90 value that is at least 7% of the D50 value of the matrix particles. In certain cases, the conductive particles have a D90 value that is at least 10% of the D50 value of the matrix particles. In certain cases, the conductive particles have a D90 value that is at least 15% of the D50 value of the matrix particles. In certain cases, the conductive particles have a D90 value that is at least 20% of the D50 value of the matrix particles.

In certain embodiments, the conductive particles have a D90 value that is at least 5% of the D90 value of the matrix particles. In certain embodiments, the conductive particles have a D90 value that is at least 10% of the D90 value of the matrix particles. In certain embodiments, the conductive particles have a D90 value that is at least 15% of the D90 value of the matrix particles.

In the case that the conductive particles comprise a mixture of electronically-conductive particles and ionically-conductive particles, the two particle types are generally provided within the ink formulation in broadly similar amounts, as measured by volume. Thus, for example, the ratio of electronically-conductive particles to ionically-conductive particles (expressed as the ratio of the total volume of each particle type) may lie in the range from 5:1 to 1:5. In certain embodiments, this ratio may lie in the range from 3:1 to 1:3. In certain embodiments, this ratio may lie in the range from 2:1 to 1:2.

Typically, the conductive particles are present in an amount of at least 5 vol % relative to the solids content of the ink formulation, in certain cases 10 vol % relative to the solids content of the ink formulation, preferably at least 15 vol %, more preferably at least 20 vol %.

In the case that the conductive particles comprise a mixture of electronically-conductive particles and ionically-conductive particles, it is preferred that the conductive particles are present in an amount of at least 10 vol % relative to the solids content of the ink formulation, in certain cases at least 15 vol % relative to the solids content of the ink formulation, preferably at least 18 vol %, more preferably at least 22 vol %.

Typically, the conductive particles are present in an amount of up to 35 vol % relative to the solids content of the ink formulation, preferably up to 30 vol %, more preferably up to 28 vol %.

Preferably, the conductive particles should have a D90 value that is up to 30%, more preferably up to 25%, most preferably up to 20% of the D90 value of the matrix particles.

It is preferred that the particle size distribution of the matrix particles is such that the D90 value for the matrix particles is at least 1.5 times the D50 value, more preferably at least 1.7 times the D50 value, most preferably at least 2 times the D50 value.

It is preferred that the particle size distribution of the conductive particles is such that the D90 value for the conductive particles is at least 1.5 times the D50 value, more preferably at least 1.7 times the D50 value, most preferably at least 2 times the D50 value.

Typically, the conductive particles have a D50 value of at least 5 nm. In certain embodiments, the conductive particles may have a D50 value of at least 10 nm. In certain embodiments, the conductive particles may have a D50 value of at least 20 nm. In certain embodiments, the conductive particles may have a D50 value of at least 100 nm.

Typically, the conductive particles have a D50 value of up to 5 µm. In certain embodiments, the conductive particles have a D50 value of up to 2 µm. In certain embodiments, the conductive particles have a D50 value of up to 500 nm. In certain embodiments, the conductive particles have a D50 value of up to 400 nm. In certain embodiments, the conductive particles have a D50 value of up to 300 nm.

Typically, the conductive particles have a D90 value of at least 50 nm. In certain embodiments, the conductive particles may have a D90 value of at least 100 nm. In certain embodiments, the conductive particles may have a D90 value of at least 200 nm. In certain embodiments, the conductive particles may have a D90 value of at least 500 nm.

Typically, the conductive particles have a D90 value of up to 25 µm. In certain embodiments, the conductive particles have a D90 value of up to 20 µm. In certain embodiments, the conductive particles have a D90 value of up to 15 µm. In certain embodiments, the conductive particles have a D90 value of up to 10 µm. In certain embodiments, the conductive particles have a D90 value of up to 5 µm. In certain embodiments, the conductive particles have a D90 value of up to 2 µm. In certain embodiments, the conductive particles have a D90 value of up to 1 µm.

Typically, the matrix particles have a D50 value of at least 0.1 µm. In certain embodiments, the matrix particles have a D50 value of at least 0.2 µm. In certain embodiments, the matrix particles have a D50 value of at least 0.5 µm.

Typically, the matrix particles have a D50 value of up to 20 µm. In certain embodiments, the matrix particles have a D50 value of up to 15 µm. In certain embodiments, the matrix particles have a D50 value of up to 10 µm. In certain embodiments, the matrix particles have a D50 value of up to 5 µm. In certain embodiments, the matrix particles have a D50 value of up to 2 µm. In certain embodiments, the matrix particles have a D50 value of up to 1 µm.

Typically, the matrix particles have a D90 value of at least 0.5 µm. In certain embodiments, the matrix particles have a D90 value of at least 1 µm. In certain embodiments, the matrix particles have a D90 value of at least 2 µm. In certain embodiments, the matrix particles have a D90 value of at least 5 µm.

Typically, the matrix particles have a D90 value of up to 40 µm. In certain embodiments, the matrix particles have a D90 value of up to 30 µm. In certain embodiments, the matrix particles have a D90 value of up to 20 µm. In certain embodiments, the matrix particles have a D90 value of up to 15 µm. In certain embodiments, the matrix particles have a D90 value of up to 12 µm.

Preferably, the particle size distribution of the conductive particles and/or the matrix particles is positively skewed, that is, the median particle size is greater than the mode.

In the case that the conductive particles are provided by a mixture of electronically-conductive particles and ionically-conductive particles, the electronically-conductive particles are blocky in shape, as indicated by a sphericity of at least 0.6, rather than being shaped as needles, filaments, or other high-aspect ratio forms. Typically, the sphericity of the electronically-conductive particles is at least 0.7, most preferably at least 0.8.

Typically, the sphericity of the matrix particles and/or the ionically-conductive particles is at least 0.6, preferably at least 0.7, more preferably at least 0.8.

The composite material prepared according to the method of the seventh aspect of the invention may include any of the features of the composite material according to the first aspect of the invention, whether taken alone or in combination.

In an eighth aspect, the present invention may provide a method of making a composite material, the method comprising the steps of:
  providing a quantity of ionically-conductive particles, an amount of an electronically-conductive phase and a quantity of matrix particles, the matrix particles comprising an electrode active material;
  preparing an ink formulation comprising the matrix particles, the ionically-conductive particles, the electronically-conductive phase, and a fluid carrier medium; and
  depositing the ink formulation on a substrate to provide a printed layer;
  wherein the ionically-conductive particles have a D90 value that is at least 5% of the D50 value of the matrix particles.

The electronically-conductive phase may be provided in the form of high-aspect ratio components, such as filaments or needles. Such high-aspect ratio components typically have a length that is at least 4 times their diameter, in certain cases at least 5 times their diameter. Such high-aspect ratio materials may include titanium nitride whiskers and carbonaceous high-aspect materials, e.g. carbon nanotubes.

In other cases, the electronically-conductive phase may be provided in the form of blocky particles having a sphericity of at least 0.6, but whose particle size is significantly lower than that of the ionically-conductive particles. For example, the D50 value of the particles of the electronically-conductive phase may be less than 25% (in some embodiments less than 15%) of the D50 value of the ionically-conductive particles. In such cases, the particles of the electronically-conductive phase may comprise any one of the electronically-conductive materials specified in relation to the first aspect of the invention.

Thus, the invention according to the eighth aspect may provide a method of making a composite material, the method comprising the steps of:
  providing a quantity of ionically-conductive particles, a quantity of electronically-conductive particles and a quantity of matrix particles, the matrix particles comprising an electrode active material;

preparing an ink formulation comprising the matrix particles, the ionically-conductive particles, the electronically-conductive particles, and a fluid carrier medium; and depositing the ink formulation on a substrate to provide a printed layer;

wherein the ionically-conductive particles have a D90 value that is at least 5% of the D50 value of the matrix particles.

The composition and properties of the matrix particles and the ionically-conductive particles may be as specified in relation to the equivalent elements of the second aspect of the invention.

In certain cases, the ionically-conductive particles have a D90 value that is at least 7% of the D50 value of the matrix particles. In certain cases, the ionically-conductive particles have a D90 value that is at least 10% of the D50 value of the matrix particles. In certain cases, the ionically-conductive particles have a D90 value that is at least 15% of the D50 value of the matrix particles. In certain cases, the ionically-conductive particles have a D90 value that is at least 20% of the D50 value of the matrix particles.

Typically, the ionically-conductive particles are present in a volume fraction of at least 3 vol % of the composite material, in certain cases at least 5 vol % of the composite material, in further cases at least 10 vol % relative to the solids content of the ink formulation, preferably at least 15 vol %, more preferably at least 20 vol %.

In general, the ionically-conductive particles are present in a volume fraction of up to 35 vol % relative to the solids content of the ink formulation, preferably up to 30 vol %, more preferably up to 28 vol %.

In certain embodiments, the ionically-conductive particles have a D90 value that is at least 5% of the D90 value of the matrix particles. In certain embodiments, the ionically-conductive particles have a D90 value that is at least 10% of the D90 value of the matrix particles. In certain embodiments, the ionically-conductive particles have a D90 value that is at least 15% of the D90 value of the matrix particles.

In general, the ionically-conductive particles have a D90 value that is up to 30% of the D90 value of the matrix particles, preferably up to 25%, more preferably up to 20%.

Preferably, the particle size distribution of the ionically-conductive particles is such that the D90 value for the ionically-conductive particles is at least 1.5 times the D50 value, more preferably at least 1.7 times the D50 value, most preferably at least 2 times the D50 value.

In general, the particle size distribution of the matrix particles is such that the D90 value for the matrix particles is at least 1.5 times the D50 value, more preferably at least 1.7 times the D50 value, most preferably at least 2 times the D50 value.

Typically, the ionically-conductive particles have a D50 value of at least 5 nm. In certain embodiments, the ionically-conductive particles may have a D50 value of at least 10 nm. In certain embodiments, the ionically-conductive particles may have a D50 value of at least 20 nm. In certain embodiments, the ionically-conductive particles may have a D50 value of at least 100 nm.

Typically, the ionically-conductive particles have a D50 value of up to 5 μm. In certain embodiments, the conductive particles have a D50 value of up to 2 μm. In certain embodiments, the conductive particles have a D50 value of up to 500 nm. In certain embodiments, the ionically-conductive particles have a D50 value of up to 400 nm. In certain embodiments, the ionically-conductive particles have a D50 value of up to 300 nm.

Typically, the ionically-conductive particles have a D90 value of at least 50 nm. In certain embodiments, the ionically-conductive particles may have a D90 value of at least 100 nm. In certain embodiments, the ionically-conductive particles may have a D90 value of at least 200 nm. In certain embodiments, the ionically-conductive particles may have a D90 value of at least 500 nm.

Typically, the ionically-conductive particles have a D90 value of up to 25 μm. In certain embodiments, the conductive particles have a D90 value of up to 20 μm. In certain embodiments, the conductive particles have a D90 value of up to 15 μm. In certain embodiments, the conductive particles have a D90 value of up to 10 μm. In certain embodiments, the conductive particles have a D90 value of up to 5 μm. In certain embodiments, the conductive particles have a D90 value of up to 2 μm. In certain embodiments, the ionically-conductive particles have a D90 value of up to 1 μm.

Typically, the matrix particles have a D50 value of at least 0.1 μm. In certain embodiments, the matrix particles have a D50 value of at least 0.2 μm. In certain embodiments, the matrix particles have a D50 value of at least 0.5 μm.

Typically, the matrix particles have a D50 value of up to 20 μm. In certain embodiments, the matrix particles have a D50 value of up to 15 μm. In certain embodiments, the matrix particles have a D50 value of up to 10 μm. In certain embodiments, the matrix particles have a D50 value of up to 5 μm. In certain embodiments, the matrix particles have a D50 value of up to 2 μm. In certain embodiments, the matrix particles have a D50 value of up to 1 μm.

Typically, the matrix particles have a D90 value of at least 0.5 μm. In certain embodiments, the matrix particles have a D90 value of at least 1 μm. In certain embodiments, the matrix particles have a D90 value of at least 2 μm. In certain embodiments, the matrix particles have a D90 value of at least 5 μm.

Typically, the matrix particles have a D90 value of up to 40 μm. In certain embodiments, the matrix particles have a D90 value of up to 30 μm. In certain embodiments, the matrix particles have a D90 value of up to 20 μm. In certain embodiments, the matrix particles have a D90 value of up to 15 μm. In certain embodiments, the matrix particles have a D90 value of up to 12 μm.

Preferably, the particle size distribution of the particles of the ionically-conductive material and/or the electrode active material is positively skewed, that is the median particle size is greater than the mode.

Typically, the sphericity of the particles of the electrode active material and/or the ionically-conductive particles is at least 0.6, preferably at least 0.7, more preferably at least 0.8.

The composite material prepared according to the method of the eighth aspect of the invention may include any of the features of the composite material according to the second aspect of the invention, whether taken alone or in combination.

In a ninth aspect, the present invention may provide a method of making a composite material, the method comprising the steps of:

providing a quantity of ionically-conductive particles, a quantity of electronically-conductive particles and a quantity of matrix particles, the matrix particles comprising an electrode active material;

preparing an ink formulation comprising the matrix particles, the ionically-conductive particles, the electronically-conductive particles, and a fluid carrier medium; and depositing the ink formulation on a substrate to provide a printed layer;

wherein the electronically-conductive particles have a D90 value that is at least 5% of the D50 value of the matrix particles.

In the method according to the ninth aspect of the invention, the particle size of the ionically-conductive particles may be significantly lower than that of the electronically-conductive particles. For example, the D50 value of the ionically-conductive particles may be less than 25% (in some embodiments less than 15%) of the D50 value of the electronically-conductive particles.

The composition, particle size distribution, and other properties of the matrix particles, ionically-conductive particles and electronically-conductive particles may be as specified in relation to the equivalent elements of the third aspect of the invention. Thus, the composite material prepared according to the method of the ninth aspect of the invention may include any of the features of the composite material according to the third aspect of the invention, whether taken alone or in combination.

Typically, the method according to the seventh, eighth, or ninth aspects of the present invention further comprises one or more of the following steps:

reduction of the amount of organic compounds present in the printed layer, e.g. by drying;

mechanical pressing of the printed layer; or sintering of the printed layer.

Typically, the method according to the seventh, eighth, or ninth aspects of the present invention further comprises the step of including a binder phase in the ink formulation. A suitable binder phase may comprise, for example, lithium borate.

The binder phase is generally present in a volume fraction of at least 1 vol % relative to the solids content of the ink formulation. In certain embodiments, the binder phase is present in a volume fraction of at least 2 vol % relative to the solids content of the ink formulation. In certain embodiments, the binder phase is present in a volume fraction of at least 5 vol % relative to the solids content of the ink formulation.

The binder phase is generally present in an amount of up to 20 vol % relative to the solids content of the ink formulation. In certain embodiments, the binder phase is present in an amount of up to 15 vol % relative to the solids content of the ink formulation. In certain embodiments, the binder phase is present in an amount of up to 10 vol % relative to the solids content of the ink formulation.

The step of depositing the ink formulation on the substrate to provide a printed layer may be carried out in a single stage or in multiple stages.

In a tenth aspect, the present invention may provide the use of a composite material according to one of the first, second, or third aspects of the invention in the manufacture of an electrode.

The electrode may be an anode or a cathode.

In an eleventh aspect, the present invention may provide the use of a composite material made according to the method of one of the seventh, eighth, or ninth aspects of the invention in the manufacture of an electrode.

The electrode may be an anode or a cathode.

In a twelfth aspect, the present invention may provide the use of a composite material according to one of the first, second, or third aspects of the invention to absorb and/or release lithium ions during an electrochemical reaction.

In a thirteenth aspect, the present invention may provide the use of a composite material made according to the method of one of the seventh, eighth, or ninth aspects of the invention to absorb and/or release lithium ions during an electrochemical reaction.

The term 'ionically-conductive particle' is used herein to refer to particles present within a composite material that has a matrix provided by matrix particles that comprise an electrode active material, the ionically-conductive particles being configured to allow transport of lithium ions therethrough. By contrast, the term 'bulk electrolyte' is intended to refer to an electrolyte phase (also known as a separator) located between the anode and cathode of an electrochemical cell.

For the avoidance of doubt, it is noted that the term 'ionically-conductive particle' refers to a particle of an electrolyte material, which may or may not have the same composition and/or properties as the electrolyte material of the bulk electrolyte.

DETAILED DESCRIPTION

The invention will now be described by way of example only with reference to the following Figures in which.

EXAMPLE 1

A composite material was prepared for use a cathode.

As a first step, an ink was prepared containing the solid phases listed in Table 1.

TABLE 1

| Phase | Volume fraction of total solids content (%) | D50 | D90 |
|---|---|---|---|
| Electrode active material: $LiNi_xCo_yMn_zO_2$ | 64 | 1 μm | 3 μm |
| Ionically-conductive material: $Li_7La_3Zr_{1.4}Ta_{0.6}O_{12}$ | 13 | 100 nm | 512 nm |
| Electronically-conductive material: indium tin oxide | 13 | | |
| Binder: lithium borate | 7 | N/A | N/A |
| Compositing agent | 3 | N/A | N/A |

The ink further contained binders, dispersants and solvents, as is known in the art. The solids content of the ink was 50 wt %±10%.

The composite material was printed onto a support using a screen-printing process, followed by the steps of:

drying at a temperature below 150° C. to remove solvent from the ink;

debinding using thermal or catalytic processes to remove heavy organic components;

mechanical pressing; and sintering.

EXAMPLE 2

A further composite material was prepared for use a cathode.

The proportions and particle sizes of the electrode active, ionically-conductive and electronically-conductive components of the cathode are set out in Table 2.

The impedance of the composite material was measured using an Impedance Analyser. The impedance was measured using an AC excitation signal with an amplitude of 10 mV across a frequency range of 1 MHz to, for example, 0.1 Hz. The response at each frequency was determined using a five second integration time. Seven frequencies were measured per decade with logarithmic spacing between the upper and lower frequency limits.

Figure 1:
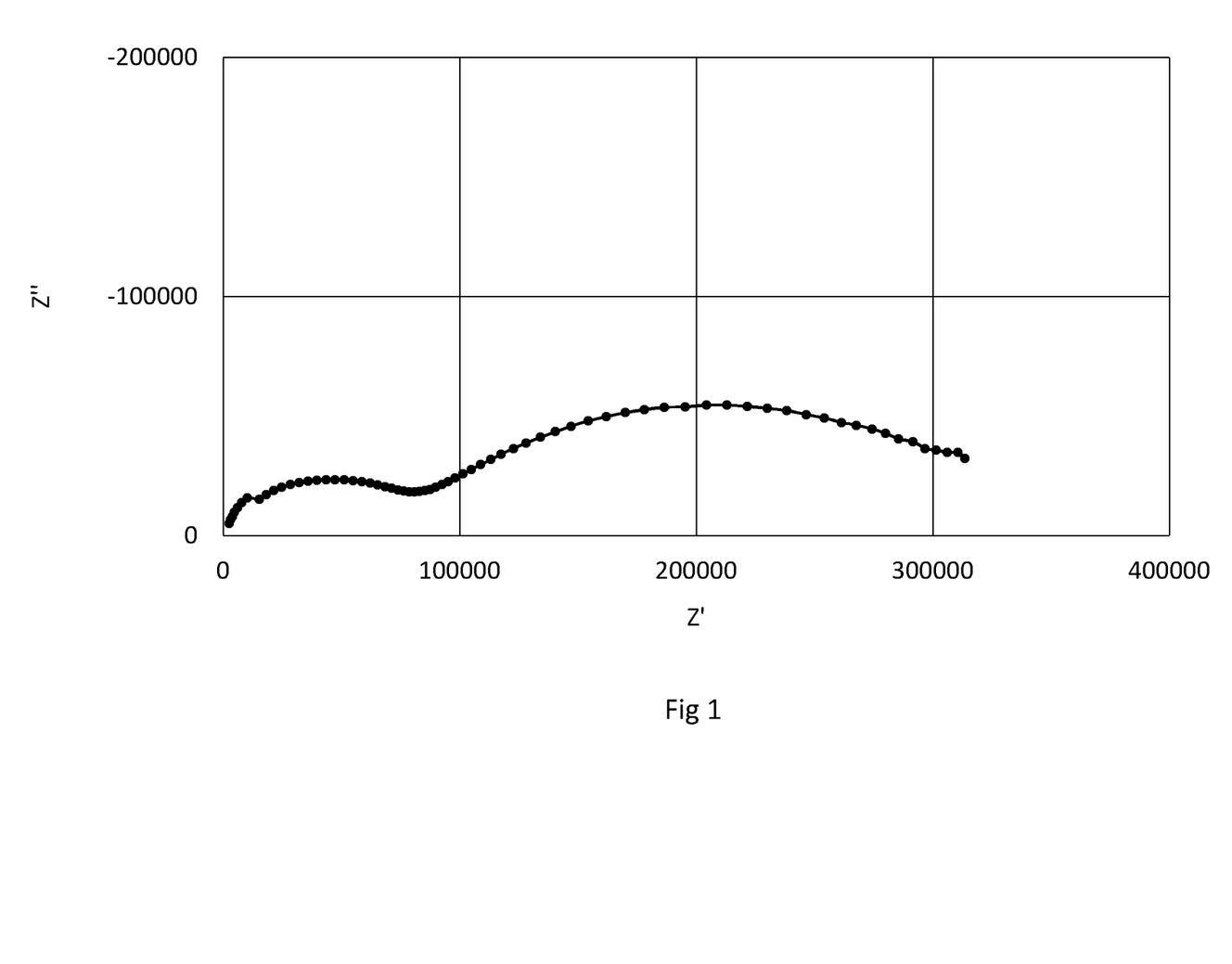
FIG. 1 is a graph of the electrical AC response used to determine the impedance of a composite material according to an embodiment of the second aspect of the invention.

The impedance results are presented in the Nyquist diagram shown in FIG. 1. In this diagram, Z" (the imaginary part of the complex impedance) is plotted against Z' (the real part of the complex impedance). The diagram has two portions: a first arc-shaped portion adjacent the origin of the graph and a second arc-shaped portion at higher values of Z'.

The diameter of the first arc-shaped portion is a function of the impedance of the ionic charge transfer within the composite material, while the diameter of the second arc-shaped portion is a function of the impedance of the electronic charge transfer within the composite material. The clearly-defined shapes of the two portions of the plot indicate that electronically- and ionically-conductive networks have been established within the composite material, which therefore has a finite ionic and electronic impedance and is suitable for use as an electrode.

TABLE 2

| Phase | Mass fraction based on total content of electrode active, ionically-conductive and electronically-conductive materials (%) | Volume fraction based on total content of electrode active, ionically-conductive and electronically-conductive materials (%) | D50 | D90 |
|---|---|---|---|---|
| Electrode active material: $LiNiCoMnO_2$ | 70 | 87 | 11.9 μm | 21.9 μm |
| Ionically-conductive material: $Li_{6.4}La_3Zr_{1.4}Ta_{0.6}O_{12}$ | 7.5 | 3.9 | 1 μm | 5 μm |
| Electronically-conductive material: indium tin oxide | 22.5 | 9.1 | 0.1 μm | N/A |

COMPARATIVE EXAMPLE 3

Composite materials were prepared containing particles of an electrode active material ($LiNiCoMnO_2$) and an ionically-conductive material (LICGC™ electrolyte from Ohara Inc).

The particle sizes of the two materials are set out in Table 3.

Three samples were prepared containing 16 vol %, 26 vol % and 50 vol % LICGC™ respectively. A further sample was prepared containing no LICGC™.

Figure 2:
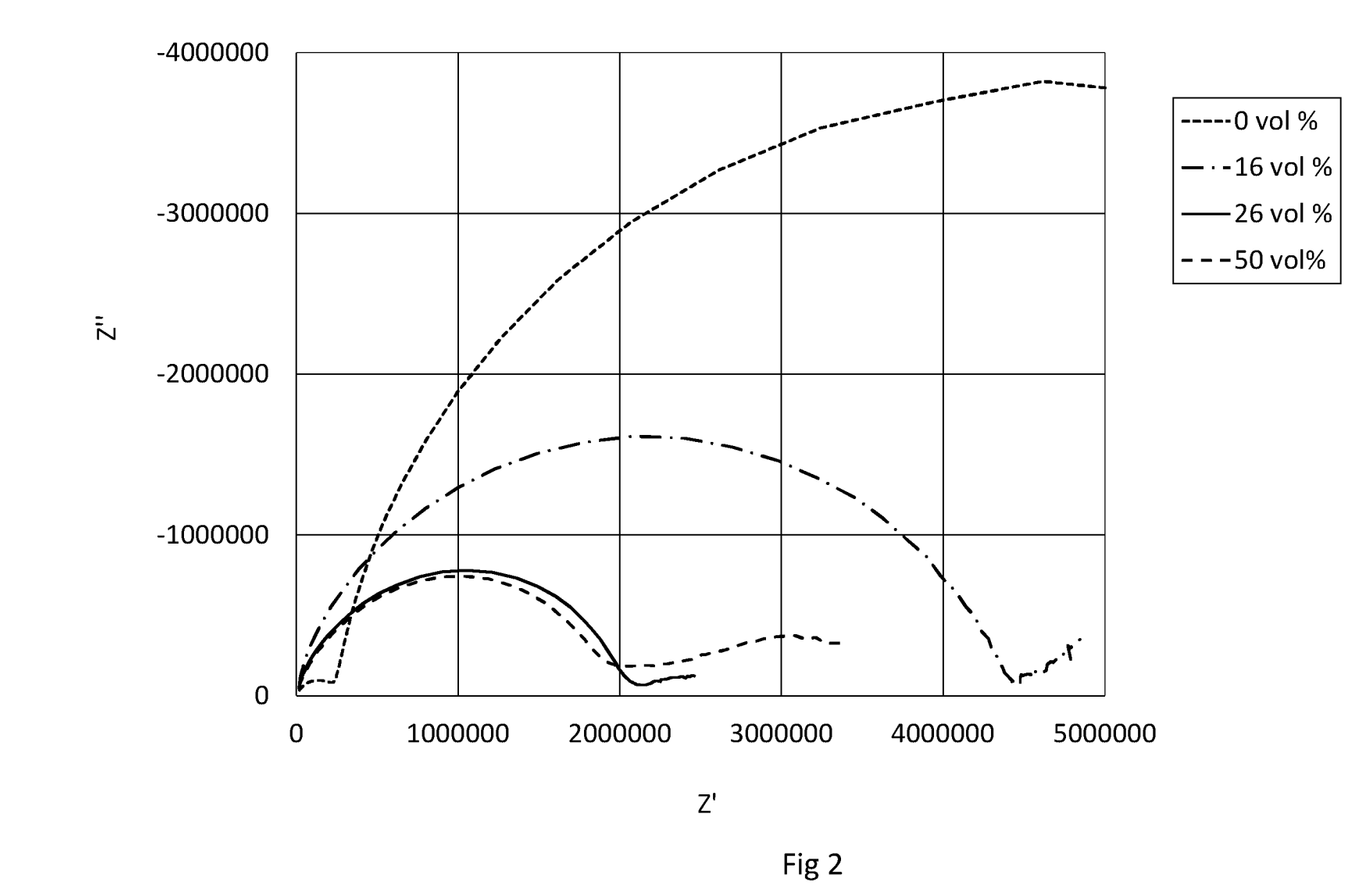
FIG. 2 is a graph of the electrical AC response used to determine the impedance of a composite material according to a comparative example of the invention.

Impedance measurements were carried out on all the samples, using the method described in relation to Example 2, and the results are shown in FIG. 2. These show that as the content of ionically-conductive material increases from 0 vol % to 16 vol %, the impedance decreases as an ionically-conductive network starts to be formed through the composite material. An increase in the content of ionically-conductive material from 16 vol % to 26 vol % results in further development of the ionically-conductive network and a corresponding further decrease in impedance.

However, no further decrease in impedance occurs when the content of ionically-conductive material increases from 26 vol % to 50 vol %, demonstrating that when the ionically-conductive material is present in an amount of 26 vol %, a fully-formed conductive network is present and there is no benefit to increasing the content of ionically-conductive material any further.

TABLE 3

| Material | D50 | D90 |
|---|---|---|
| Electrode active material: $LiNiCoMnO_2$ | 11.9 μm | 21.9 μm |
| Ionically-conductive material (LICGC ™) | 0.3 μm | 0.9 μm |

The invention claimed is:

1. An all solid-state electrochemical cell comprising two electrodes and a bulk electrolyte disposed therebetween, wherein at least one electrode comprises a composite material comprising:
    a matrix that is provided by matrix particles that comprise an electrode active material; and
    a conductive fraction that is both electronically-conductive and ionically-conductive, the conductive fraction being provided by conductive particles that are distributed among the matrix particles, the conductive particles comprising either:
    a material that is both ionically- and electronically-conductive; or
    a mixture of ionically-conductive particles and electronically-conductive particles, the electronically-conductive particles having a sphericity of at least 0.6;
    wherein the conductive particles have a D90 value that is at least 5% of the D50 value of the matrix particles; and
    wherein the matrix particles have a particle size distribution such that the D90 value for the matrix particles is at least 1.7 times the D50 value.

2. The electrochemical cell according to claim 1, wherein the conductive particles provide 5-35 vol % of the composite material.

3. The electrochemical cell according to claim 1, wherein the conductive particles have a D90 value that is at least 10% of the D50 value of the matrix particles.

4. The electrochemical cell according to claim 1, wherein the conductive particles have a D90 value of at least 50 nm.

5. The electrochemical cell according to claim 1, wherein the matrix particles have a D50 value of at least 0.1 μm.

6. The electrochemical cell according to claim 1, wherein the composite material has a planar configuration having a thickness of at least 300 μm.

7. A method of making the electrochemical cell according to claim 1 in which the at least one electrode includes the composite material, the method comprising the steps of:
- providing a quantity of matrix particles, the matrix particles comprising an electrode active material;
- providing a quantity of conductive particles, the conductive particles comprising either:
  - a material that is both ionically- and electronically-conductive; or
  - a mixture of ionically-conductive particles and electronically-conductive particles, the electronically-conductive particles having a sphericity of at least 0.6;
- preparing an ink formulation comprising the matrix particles, the conductive particles, and a fluid carrier medium; and
- depositing the ink formulation on a substrate to provide a printed layer;

wherein the conductive particles have a D90 value that is at least 5% of the D50 value of the matrix particles.

8. The method according to claim 7, wherein the conductive particles provide 5-35 vol% of the solids content of the ink formulation.

9. The method according to claim 7, wherein the conductive particles have a D90 value that is at least 10% of the D50 value of the matrix particles, preferably at least 15% of the D50 value of the matrix particles, more preferably at least 20%.

10. The method according to claim 7, wherein the conductive particles have a D90 value of at least 50 nm, preferably at least 100 nm, more preferably at least 200 nm.

11. The method according to claim 7, wherein the electronically conductive phase comprises a quantity of electronically-conductive particles.

12. The method according to claim 11, wherein the D50 value of the electronically-conductive particles is less than 25% of the D50 value of the ionically- conductive particles.

13. The method according to claim 7, wherein the matrix particles have a D50 value of at least 0.1 μm, preferably at least 0.2 μm, at least 0.5um.

* * * * *